May 14, 1963
A. J. HAUCK
3,090,040
DETECTION CIRCUIT
Filed March 11, 1958
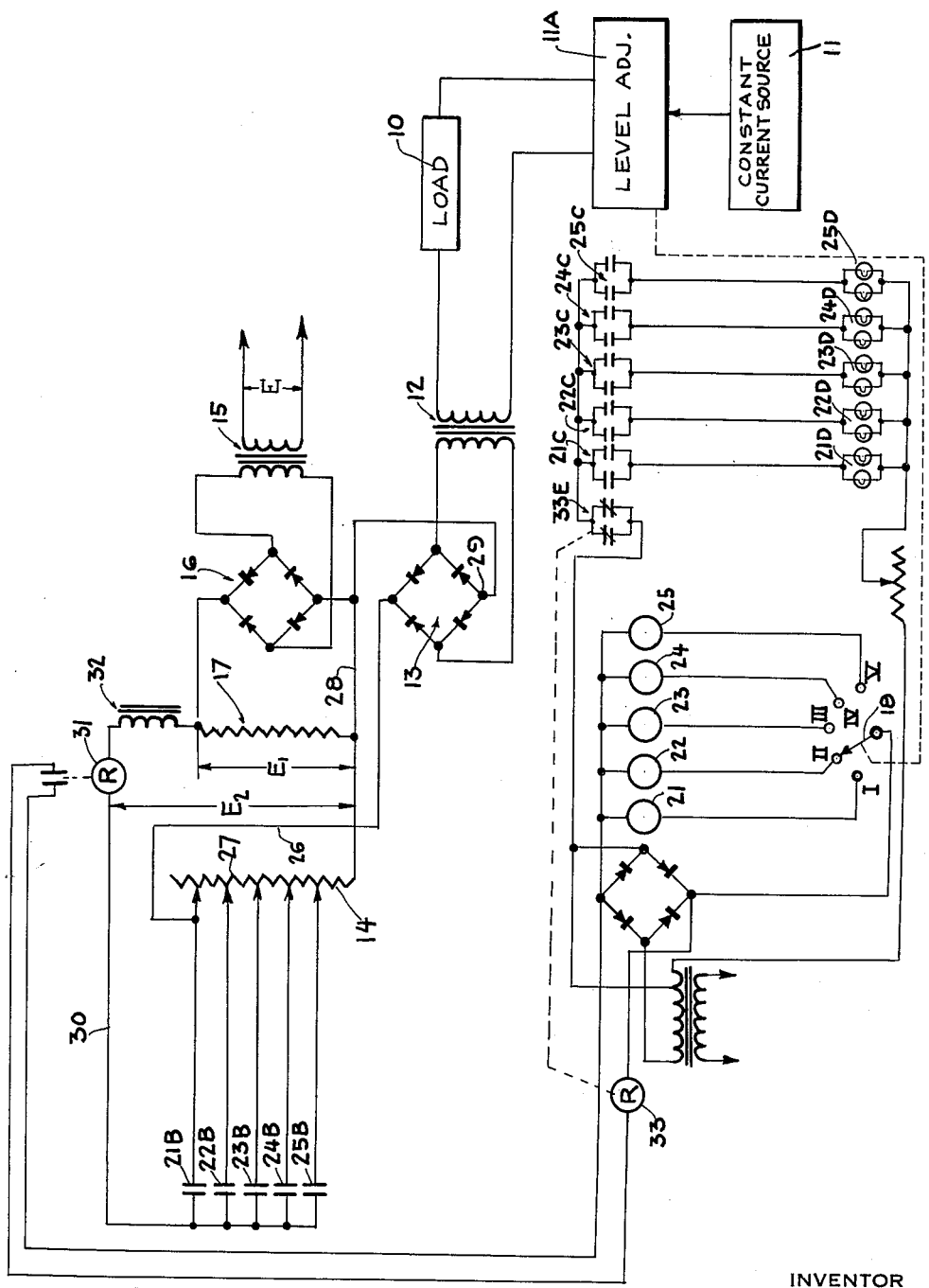
INVENTOR
ALOYSIUS J. HAUCK
BY
Pollard Johnston Smythe & Robertson
ATTORNEYS 3,090,040
DETECTION CIRCUIT
Aloysius J. Hauck, Milwaukee, Wis., assignor, by mesne assignments, to Basic Products Corporation, Milwaukee, Wis., a corporation of Wisconsin
Filed Mar. 11, 1958, Ser. No. 720,777
5 Claims. (Cl. 340—253)

This invention relates to a system for detecting if preselected changes have beeen made in a load circuit and especially an arrangement for detecting preselected brightness changes in a lighting circuit such as one used for airport lighting or the like.

In airport lighting systems, runway lights are located at considerable distances from the control tower and it is desirable to operate these lights at various levels of brightness, the level depending upon the particular circumstances and weather conditions. It is desirable to be able to change the brightness in preselected steps and then to have an indication in the control tower, or elsewhere, that the lights are illuminated at the preselected level. This problem also may exist in other places where lights are installed at a distance from the control point.

One of the obects of the invention is to provide a system which will give an indication of proper operation of the components thereof.

Another of the objects of the invention is to provide an arrangement which will show if the system is operating at a preselected level.

A still further object of the invention is to provide a means for detecting if the preselected level of brightness of a lighting load has been accomplished.

In one aspect, the invention is useable in conjunction with a load employing a plurality of lamps fed through isolating transformers. One load may be fed from a constant current source but can be supplied in other ways. Such a system may have means for controlling the brightness of the lamps in various manners, such as, for example, a plurality of resistances in the load circuit or by transformer tap changes. A brightness selecting means can be provided for controlling the load current in steps to produce a selected brightness level. Means for producing a signal, such as a voltage signal, is provided as a reference. A second signal producing means to produce a signal or voltage proportional to the actual load current and a preselected voltage component proportional to the selected level of load current is provided. A circuit for combining said two voltages or signals is employed, the signals being subtracted therein so that when the correct load current is present for the selected brightness, the combined signal will be zero or null. An addition circuit with appropriate changes in control also could be used.

A relay or other indicating or control means can be connected in the nulling circuit, such being responsive to the combined signal, said relay being employed to operate indicating lights at a remote point, such as in the tower adjacent the level selecting switch so as to show the operator that the system is operating at its preselected condition or brightness.

These and other objects, advantages and features will become apparent from the following description and drawings.

In the drawings:

The FIGURE shows a schematic circuit for utilizing the invention.

The load is schematically indicated at 10 and the source of constant current at 11. The level of load current can be changed by a suitable means indicated at 11A. Current transformer 12 is connected in the load circuit, the secondary of said transformer being connected to rectifier bridge 13. The rectifier bridge is connected to resistance 14 so as to provide a D.C. voltage component thereacross proportional to the load current. A source of constant D.C. voltage of preselected value, referred to as the first signal, is furnished through constant voltage transformer means 15, said constant voltage transformer being supplied by a voltage E and being connected to constant voltage rectifier bridge 16, said rectifier bridge being in turn connected across resistance 17 providing reference voltage $E_1$.

The switch for controlling brightness may have an arm 18 connectable with any one of the contacts I, II, III, IV, or V for the corresponding relative brightness levels, the switch being shown connected to the second brightness level. The arm also can be mechanically or electrically connected to a means (not shown) for operating the level adusting or changing means 11A.

Relays 21, 22, 23, 24 and 25 are selectively energized by switch 18, said relays serving to close corresponding selected normally open contacts 21B, 22B, 23B, 24B or 25B. Energization of one of the relays 21 to 25 also will close the appropriate contacts of one of the switches 21C to 25C. Each of the normally open switches 21C to 25C has double contacts to insure that the corresponding signal lamp means 21D to 25D will be illuminated when the relay is closed and the correct load current or level exists. The contacts associated with a relay coil are designated by adding a letter subscript to the coil number.

If the brightness selector is turned, for example, to the second level, then relay 22 will be energized which will close switches 22B and 22C. Operation of the brightness selector arm also changes the current supply to the load to produce the desired brightness level.

A current proportional to the load current will be produced at the outlet of rectifier 13 which then will be fed through line 26, across resistance 27, line 28, back to the rectifier bridge at 29. Closed switch 22B will pick off a voltage from resistor 27 and through line 30 to the relay 31. A choke 32 can be used in the circuit so as to reduce relay chatter. This voltage will be proportional to the actual load current and selected level thereof, such being indicated as the second voltage $E_2$. Voltage $E_2$ will be balanced against voltage $E_1$ from the constant voltage transformer 15 in the relay or means 31. Relay 31 can be arranged so that if null conditions exist, no signal will be fed relay 33.

Relay 33 controls the normally closed contacts 33E so that when relay 33 is unenergized, switches 33E will remain closed. Because normally open switch contacts 22C have been closed by relay 22, signal lamps 22D will light so as to indicate that the second level of brightness exists in the load circuit. In the event relay 31 energizes relay 33 because of unbalance, switch 33E will be opened so that indicating lamps 22D will not be illuminated and thus will inform the operator that the system is not operating in its preselected manner. In place of indicating lights, a meter or alarm could be used.

It should be apparent that various details of the circuit and construction can be made without departing from the spirit of the invention except as defined in the appended claims.

What is claimed is:

1. In an apparatus for detecting departure of a load current from any one of a plurality of selected preset values, the combination including means for providing a reference signal having a constant value, means for providing a second signal independent of said reference signal and in accordance with a preselected load current in the load circuit when the selected load current is present therein, said second signal having a constant value for all of said plurality of selected values of load current when the selected load current is present, and combining means for said reference signal and said second signal giving a predetermined signal condition when said load current corresponds to that selected.

2. In an apparatus for detecting departure of a load current from any one of a plurality of selected preset values, the combination including means for providing a reference voltage having a constant value, means for providing a second voltage independent of said reference voltage proportional to a preselected load current in the load circuit and to a preselected value, said second voltage having a constant value for all of said plurality of selected values of load current when the selected load current is present, combining means connected to said means for providing said reference voltage and said means for providing a second voltage to provide a predetermined voltage condition when said load current corresponds to that selected, and means responsive to said combining means for providing an indication when said load current is that desired.

3. In an apparatus for detecting departure of brightness level of a lighting system from any one of a plurality of selected and preset levels of brightness, the combination including means connected to a constant source voltage, a voltage divider, means connected to the load circuit and to said voltage divider for providing a second voltage independent of said constant source voltage and in accordance with the load current in the load circuit, said second voltage having a constant value for all of said plurality of selected and preset levels of brightness when the selected and preset level of brightness is present combining circuit means connected to said aforementioned means for adding said constant source voltage and said second voltage, and means responsive to said combining means for providing an indication when said load current is that preselected.

4. In an apparatus for indicating the operating condition of a lighting system operable in any one of a plurality of discrete steps, the combination including means for adjusting the current in a load circuit for providing any one of a plurality of current levels, switch means operable to select one of said levels, indicating means cooperating with said switch means for indicating when the load is at the selected level, reference voltage means having a constant value, load voltage means producing a voltage independent of said reference voltage and proportional to the current level load, said load voltage means being conditioned in response to the selected position of said switch means, said voltage proportional to the load current level having a constant value for all of said plurality of current levels when the selected level is present, combining means for said reference voltage means and said load voltage means to give a signal when said load voltage means voltage does not correspond to that selected, and means responsive to said combining means for operating said indicating means in accordance with the condition of said load current.

5. In an apparatus for indicating the operating condition of a lighting system operable in any one of a plurality of discrete steps, the combination including means for adjusting the current in a load circuit for providing any one of a plurality of current levels, switch means operable to select one of said levels, means for coupling the operation of said switch means to said adjusting means, indicating means cooperating with said switch means for indicating when the load is at the selected level, reference voltage means, load voltage means producing a voltage independent of said reference voltage and proportional to the load current level, said load voltage means being conditioned in response to the selected position of said switch means, combining means for said voltage means to give a signal when said load voltage means voltage does not correspond to that selected, and means responsive to said combining means for operating said indicating means in accordance with the condition of said load current.

References Cited in the file of this patent
UNITED STATES PATENTS

| | | |
|---|---|---|
| 2,605,304 | Proctor | July 29, 1952 |
| 2,736,878 | Boyle | Feb. 28, 1956 |
| 2,820,217 | Sperry | Jan. 14, 1958 |